United States Patent [19]

Hymer

[11] Patent Number: 4,771,369
[45] Date of Patent: Sep. 13, 1988

[54] WATERPROOF TAILLIGHT

[76] Inventor: Donald L. Hymer, 1706 Bierne Ave., Huntsville, Ala. 35801

[21] Appl. No.: 909,269

[22] Filed: Sep. 19, 1986

[51] Int. Cl.⁴ ............................................. B60Q 1/00
[52] U.S. Cl. .................................... 362/80; 362/267; 362/83
[58] Field of Search ..................... 362/267, 80, 83, 61, 362/368, 158; 340/84, 87, 89, 100, 97, 93

[56] References Cited

U.S. PATENT DOCUMENTS

| | | | |
|---|---|---|---|
| 3,612,852 | 10/1971 | Bogossian | 362/267 |
| 4,186,429 | 1/1980 | Johnston | 362/368 |
| 4,276,580 | 6/1981 | Rogers | 362/267 |
| 4,290,092 | 9/1981 | Bull | 362/368 |
| 4,450,511 | 5/1984 | Micha | 362/267 |
| 4,569,005 | 2/1986 | Bergin et al. | 362/267 |

FOREIGN PATENT DOCUMENTS 802681 9/1936 France ................... 340/83

Primary Examiner—Michael Koczo
Assistant Examiner—D. M. Cox

[57] ABSTRACT

This taillight structure is designed to be waterproof. Primarily, it consists of a plastic base that forms a waterproof seal by threading into a sleeve with a lens on the front. A bulb is also received in the base and a pair of threaded studs are secured to the base and receive nuts for fastening the structure to a surface.

1 Claim, 1 Drawing Sheet

U.S. Patent    Sep. 13, 1988    4,771,369
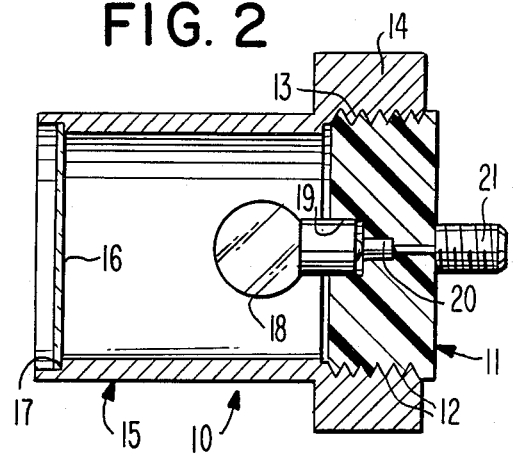
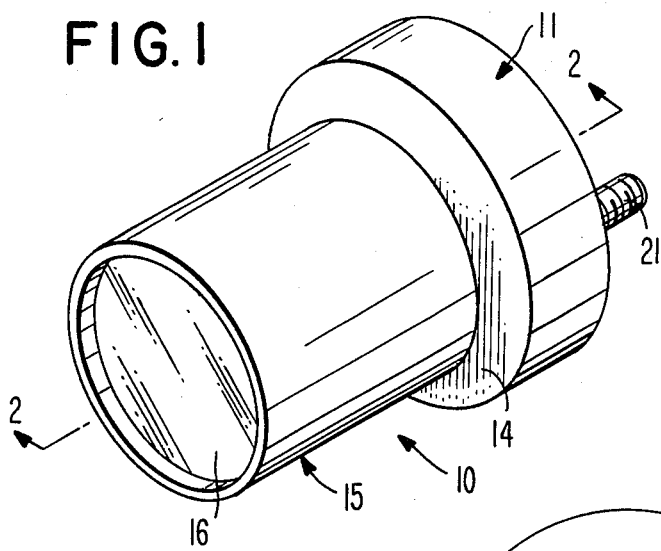
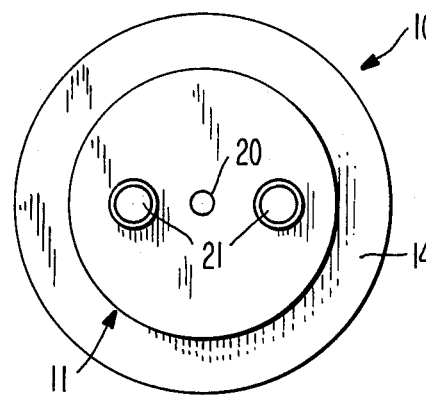
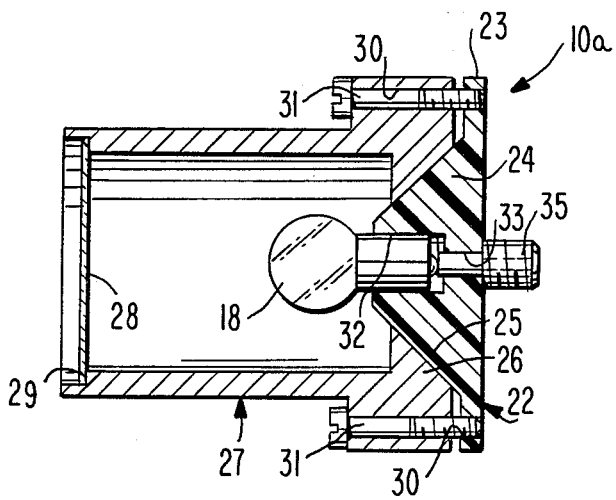
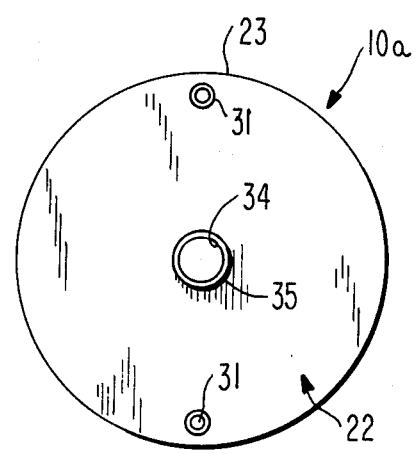

WATERPROOF TAILLIGHT

BACKGROUND OF THE INVENTION

1. Field of the Invention

This invention relates to lights, and more particularly, to a waterproof taillight.

2. Description of Prior Art

References of record are the U.S. Pat. Nos. of James A. Mikola 4,500,946, Karl Urbanek et al 4,206,499, Peter E. Brudy 4,054,792, and Paul A. La Violette 3,902,057.

The principal object of this invention is to provide a waterproof taillight, which will include a base of a suitable plastic material that will thread into a sleeve, providing waterproof sealing means for a lamp contained therein.

Another object of this invention is to provide a waterproof taillight, which will be of such design, as to include stud mounting means in the base thereof.

BRIEF DESCRIPTION OF THE DRAWINGS

FIG. 1 is a perspective view of the present invention;

FIG. 2 is a cross-sectional view, taken along the line 2—2 of FIG. 1;

FIG. 3 is a rear view of the invention, shown in elevation;

FIG. 4 is similar to FIG. 2, but illustrates a modified form of the invention, and FIG. 5 is a rear view of FIG. 4, shown in elevation.

SUMMARY OF THE INVENTION

A taillight, comprising a plastic base element that forms seal means in a threaded sleeve, and a bulb mounts in the base and is protected from water, etc.

DETAILED DESCRIPTION

Accordingly, a taillight 10 is shown to include a base 11 fabricated of a suitable plastic material, and which is provided with external threads 12 that engag with internal threads 13 in the flange 14 of hollow cylindrical sleeve 15. A lens 16 is provided and received on an annular shoulder 17 in the opposite end of sleeve 15, and a typical lamp 18 is received in opening 19 of base 11. The connections for lamp 18 are received in the opening 20 of base 11 and a pair of studs 21 are fixedly secured in base 11 in a suitable manner, and studs 21 provide mounting means for base 11 and preferably are provided with N.P.T. threads.

It shall be noted, that an "O"-ring, not shown, may be also incorporated in sleeve 15 for additional sealing means, and lens 16 may be made thicker and have threads for receiving similar threads in sleeve 15, enabling lamp 18 to be changed from the front of sleeve 15, if desired.

In use, base 11 is mounted to a surface by the studs 21 receiving nut fasteners for locking base 11 thereto. When it is desired to change lamp 18, the base 11 is unthreaded from within the flange 14 of sleeve 15.

Looking now at FIGS. 4 and 5, a modified form of taillight 10a is shown to include a plastic base 22 having an annular flange 23 integrally attached thereto, and the conical portion of base 22 seats within a conical opening 25 of the end wall 26 of a sleeve 27. A lens 28 seats upon a shoulder 29 of the opposite end of sleeve 27, in a manner similar to that of the heretofore described main embodiment of the present invention, and openings 30 are provided through sleeve 27 and flange 23, for receiving screw fasteners 31 that secure base 22 to sleeve 27. The foregoing described lamp 18 is received in the opening 32 of base 22, and an opening 33 in base 22 receives the connections for lamp 18, which are also received in the hollow portion or opening 34 of a threaded stud 35 that is fixedly secured to the center of the rear face of base 22.

In use, taillight 10a functions in the same manner described of 10, with the exception, that base 22 seats in the end wall 26 of sleeve 27 and base 22 is fastened to sleeve 27 by means of screw fasteners 31.

While various changes may be made in the detail construction, such changes will be within the spirit and scope of the present invention, as defined by the appended claims.

What I now claim is:

1. A waterproof taillight, comprising, a frusto-conical base of resilient non-conductive material, a sleeve removably received on said base and a conical opening in an end wall integrally attached to said base, provides seat means for a conical outer periphery of said frusto-conical base, and said base when seated in engagement with said seat means, prevents entry of water into said sleeve, and a second opening is provided in an apex portion of said base and frictionally receives a lamp, wherein said base includes an outwardly extending annular flange integrally attached to said base, and an outwardly extending annular flange integrally attached to said sleeve both including openings that removably receive threaded fasteners that thread into threaded openings provided through said flanges and when said threaded fasteners are tightened a watertight seal is effected between said conical outer periphery of said frustor-conical base and the conical opening in said end wall of said sleeve.

* * * * *